(12) United States Patent
Mukunoki et al.

(10) Patent No.: US 9,806,630 B2
(45) Date of Patent: Oct. 31, 2017

(54) POWER CONVERSION DEVICE

(71) Applicants: Mitsubishi Electric Corporation, Chiyoda-ku (JP); TOSHIBA MITSUBISHI-ELECTRIC INDUSTRIAL SYSTEMS CORPORATION, Chuo-Ku (JP)

(72) Inventors: Kaho Mukunoki, Chiyoda-ku (JP); Toshiyuki Fujii, Chiyoda-ku (JP); Miwako Tanaka, Chiyoda-ku (JP); Osamu Mori, Chiyoda-ku (JP); Shinzo Tamai, Chuo-Ku (JP); Sadao Funahashi, Chuo-Ku (JP); Yasuhiko Hosokawa, Chuo-Ku (JP); Kotaro Higashi, Chuo-Ku (JP)

(73) Assignees: Mitsubishi Electric Corporation, Chiyoda-ku (JP); TOSHIBA MITSUBISHI-ELECTRIC INDUSTRIAL SYSTEMS CORPORATION, Chuo-Ku (JP)

( * ) Notice: Subject to any disclaimer, the term of this patent is extended or adjusted under 35 U.S.C. 154(b) by 0 days.

(21) Appl. No.: 15/328,810

(22) PCT Filed: Jul. 23, 2015

(86) PCT No.: PCT/JP2015/070936
§ 371 (c)(1),
(2) Date: Jan. 24, 2017

(87) PCT Pub. No.: WO2016/017517
PCT Pub. Date: Feb. 4, 2016

(65) Prior Publication Data
US 2017/0214334 A1    Jul. 27, 2017

(30) Foreign Application Priority Data
Aug. 1, 2014   (JP) .................................. 2014-157280

(51) Int. Cl.
H02M 7/217     (2006.01)
H02M 1/12      (2006.01)

(52) U.S. Cl.
CPC ............ *H02M 7/217* (2013.01); *H02M 1/12* (2013.01)

(58) Field of Classification Search
CPC .... H02M 1/0845; H02M 1/084; H02M 1/081; H02M 1/4208; H02M 1/4225;
(Continued)

(56) References Cited

U.S. PATENT DOCUMENTS 5,285,029 A * 2/1994 Araki ..................... B66B 5/027
                                                        187/290
8,576,593 B2 * 11/2013 Mori ................... H02M 1/4216
                                                        363/125
(Continued)

FOREIGN PATENT DOCUMENTS

EP    2 560 275 A1    2/2013
EP    2 887 524 A1    6/2015
(Continued)

OTHER PUBLICATIONS

Makoto Hagiwara, et al., "Theoretical Analysis and Control of the Modular Multilevel Cascade Converter Based on Double-Star Chopper-Cells (MMCC-DSCC)", The Institute of Electrical Engineers of Japan, vol. 131, No. 1, pp. 84-92, (2011), (with Partial English Translation).
(Continued)

*Primary Examiner* — Adolf Berhane
(74) *Attorney, Agent, or Firm* — Oblon, McClelland, Maier & Neustadt, L.L.P.

(57) ABSTRACT

A power conversion device performs power conversion between three-phase AC, and DC, and includes a positive arm and a negative arm for each phase, each of which
(Continued)

includes one or more converter cells connected in series. A voltage command generating unit in a control device includes an AC current control unit, a circulating current control unit, and a command distributing unit, and generates a positive arm voltage command and a negative arm voltage command for each phase. In the circulating current control unit, a compensator calculates a first control command so that circulating current for each phase approaches a circulating current command value, a suppression unit generates a second control command so as to suppress a 2f component and a 4f component contained in the first control command, and then the first control command and the second control command are combined to generate a circulation control command.

15 Claims, 9 Drawing Sheets

(58) Field of Classification Search
CPC .... H02M 7/155; H02M 7/1557; H02M 7/217; H02M 3/156; H02M 3/33507; H02M 3/33592; G05F 1/30; G05F 1/455

USPC .................. 363/78–81, 84, 87, 89, 125, 127
See application file for complete search history.

(56) References Cited

U.S. PATENT DOCUMENTS

| 9,564,827 | B2* | 2/2017 | Mukunoki | H02M 7/483 |
| 9,712,084 | B2* | 7/2017 | Kikuchi | H02M 7/53871 |
| 2012/0063178 | A1* | 3/2012 | Fujita | H02M 5/4585 |
| | | | | 363/37 |
| 2015/0003136 | A1* | 1/2015 | Inomata | H02M 1/14 |
| | | | | 363/163 |
| 2016/0056727 | A1* | 2/2016 | Mukunoki | H02M 7/483 |
| | | | | 363/68 |
| 2016/0329831 | A1* | 11/2016 | Mukunoki | H02M 7/483 |
| 2017/0047860 | A1* | 2/2017 | Fujii | H02M 7/483 |

FOREIGN PATENT DOCUMENTS

| JP | 2003-37939 A | 2/2003 |
| JP | 2011-182517 A | 9/2011 |
| JP | 2013-251933 A | 12/2013 |
| WO | 2011/129222 A1 | 10/2011 |
| WO | 2014/030202 A1 | 2/2014 |
| WO | 2014-162620 A1 | 10/2014 |
| WO | 2015/104922 A1 | 7/2015 |

OTHER PUBLICATIONS

International Search Report dated Oct. 20, 2015 in PCT/JP15/070936 Filed Jul. 23, 2015.

* cited by examiner

POWER CONVERSION DEVICE

TECHNICAL FIELD

The present invention relates to a power conversion device for performing power conversion between three-phase AC, and DC, and in particular, to a large-capacity power conversion device with multi-connected converters.

BACKGROUND ART

In large-capacity power conversion devices, the converter output is high voltage or large current, and therefore, many large-capacity power conversion devices are configured with a plurality of converters multi-connected in series or parallel. Multi-connecting converters can not only increase the converter capacity, but also reduce harmonics contained in an output voltage waveform by synthesizing outputs, and as a result, can reduce harmonic current flowing to a grid.

As means for multi-connecting converters, there is a multilevel converter in which outputs of a plurality of converters are connected in cascade, and one of such multilevel converters is a modular multilevel converter. Each arm of the modular multilevel converter is composed of a plurality of converter cells connected in cascade.

Each of a first arm and a second arm for each phase of the conventional modular multilevel converter has a chopper cell (converter cell) and a reactor. The chopper cell has two semiconductor switches connected in series to each other, and a DC capacitor connected in parallel thereto. In each of the first arm and the second arm, the same number of chopper cells are connected in cascade via their respective output terminals.

Control for each phase of the conventional modular multilevel converter includes: average value control for causing the average value of voltage values of all DC capacitors to follow a capacitor voltage command value; individual balance control for causing the voltage value of each DC capacitor to follow the capacitor voltage command value; and arm balance control for causing the average value of voltage values of all the DC capacitors in the first arm and the average value of voltage values of all the DC capacitors in the second arm to coincide with each other. A voltage command value is calculated so as to control circulating current which circulates in the modular multilevel converter without flowing to the outside of the modular multilevel converter, and to control AC current for each phase (for example, see Patent Document 1 and Non-Patent Document 1).

In addition, in a power conversion device used for DC power transmission, a control device is often designed with respect to a specific operation point, and if an AC grid varies, the system might become unstable. In particular, in the case where a DC current path of a DC power transmission system is a long-distance cable, the inductance and the electrostatic capacitance of the cable increase and the resonance frequency of the DC current path decreases, and it is necessary to perform control that is stable against resonance of the DC circuit and ensures response performance. In the conventional control, DC voltage and DC current flowing through the DC current path are detected, the status value of the DC power transmission system is estimated from the detected DC voltage and DC current, and control for the DC voltage is performed, using the estimated status value, thereby suppressing resonance of the DC circuit (for example, see Patent Document 2).

CITATION LIST

Patent Document

Patent Document 1: Japanese Laid-Open Patent Publication No. 2011-182517
Patent Document 2: Japanese Laid-Open Patent Publication No. 2003-37939

Non-Patent Document

Non-Patent Document 1: IEEJ transactions D (on industry applications) Vol. 131, No. 1, 2011 (pages 84 to 92)

SUMMARY OF THE INVENTION

Problems to be Solved by the Invention

The conventional power conversion device using a modular multilevel converter performs control under the assumption that the inductance components of the positive arm and the negative arm are equal to each other. If the inductance components of the positive arts and the negative arm are different from each other, a fluctuation component contained in output voltages of the positive arm and the negative arm flows out to the DC circuit. In particular, in the case where the inductance and the electrostatic capacitance of the DC current path are great and the resonance frequency of the DC current path is low, there is a problem that the fluctuation component having flowed out to the DC circuit excites the DC circuit and current of the DC circuit oscillates.

In such a power conversion device, the disturbance generation source of DC circuit resonance is the power conversion device (modular multilevel converter), and therefore current oscillation of the DC circuit cannot be suppressed by the control shown in the above Patent Document 2, i.e., the method of controlling the DC voltage.

The present invention has been made to solve the above problems, and an object of the present invention is to obtain a power conversion device capable of, even if the positive arm and the negative arm have different inductance components, suppressing a voltage fluctuation component flowing out to the DC side and suppressing current oscillation of the connected DC circuit.

Solution to the Problems

A power conversion device according to the present invention includes: a power converter for performing power conversion between three-phase AC, and DC, the power converter including a plurality of leg circuits each having a positive arm and a negative arm connected in series, outputs of the positive arm and the negative arm being connected to each phase AC line, the plurality of leg circuits being connected in parallel between positive and negative DC buses; and a control device for controlling the power converter. Each of the positive arm and the negative arm of each leg-circuit is composed of one or a plurality of converter cells connected in series and including: a series unit of a plurality of semiconductor switching elements connected in series to each other; and a DC capacitor connected in parallel to the series unit. The control device includes a voltage command generating unit for generating a first voltage command for the positive arm and a second voltage command for the negative arm, to perform output control for each converter cell in the positive arm and the negative arm by PWM control. The voltage command generating unit includes: an AC current control unit for generating an AC control command for controlling an AC current component flowing through each phase AC line; a circulating current control unit for calculating a circulation control command for controlling a circulating current component for each phase which circulates between the leg circuits; and a command distributing unit for determining the first voltage command and the second voltage command on the basis of the AC control command, the circulation control command, and a voltage command value for voltage between the DC buses. The circulating current control unit includes: a compensator for calculating a first control command so that circulating current for each phase which, circulates between the leg circuits approaches a circulating current command value; and a suppression unit for generating a second control command for suppressing at least one of a double-frequency component and a quadruple-frequency component of an AC fundamental wave, which are contained in the calculated first control command. The circulating current control unit calculates the circulation control command by combining the first control command and the second control command.

Effect of the Invention

The power conversion device of the present invention is capable of, even if the positive arm and the negative am have different inductance components, suppressing a fluctuation component flowing out to the DC side and suppressing current oscillation of the connected DC circuit. In addition, the power conversion device of the present invention is capable of suppressing flowing out of a current oscillation component including at least one of a double-frequency component and a quadruple-frequency component of the AC fundamental wave, to the three-phase AC side, and thereby enabling reliable control of the power conversion device.

DESCRIPTION OF EMBODIMENTS

Embodiment 1

Figure 1:
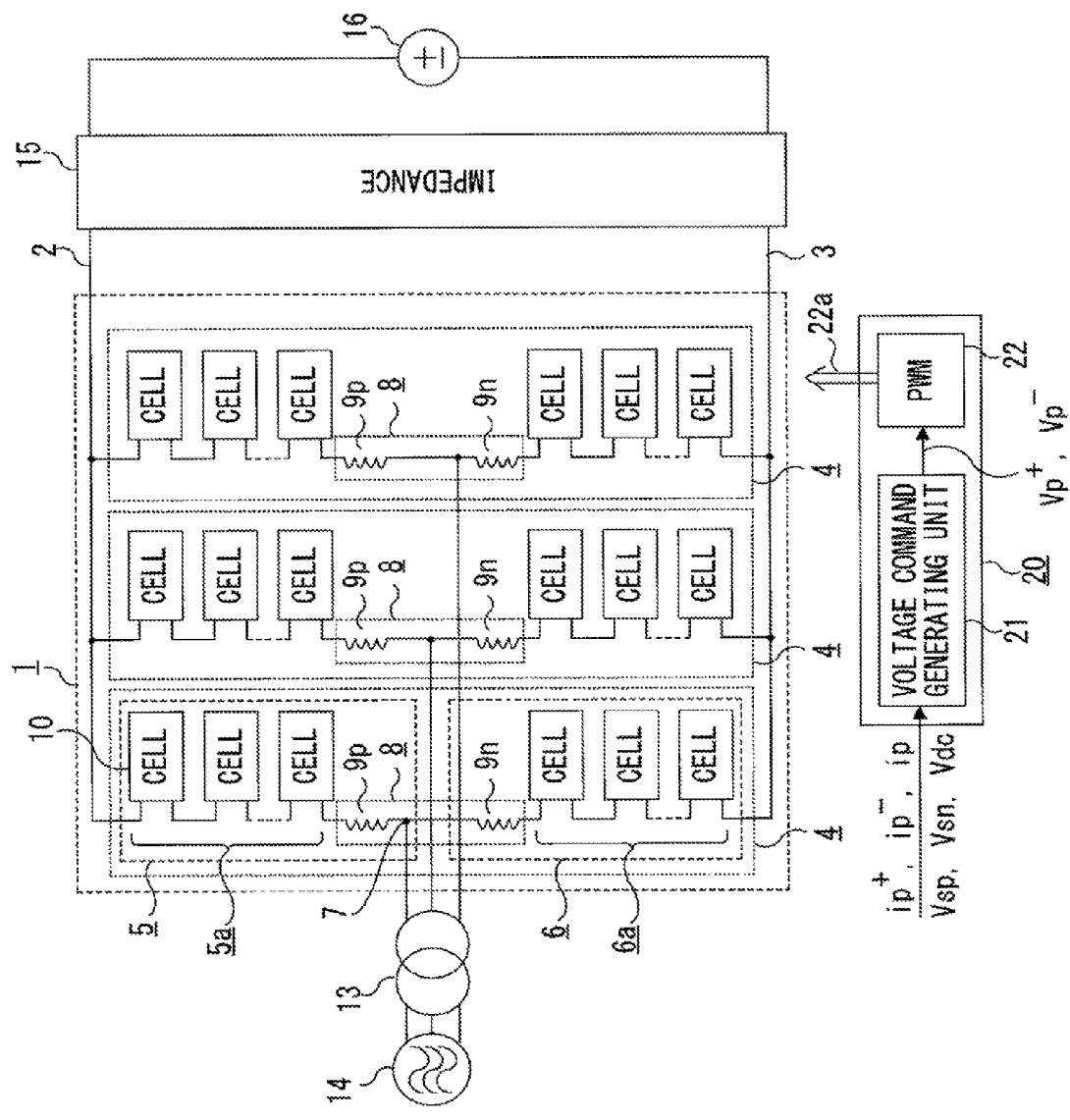
FIG. 1 is a schematic configuration diagram of a power conversion device according to embodiment 1 of the present invention.

Hereinafter, a power conversion device according to embodiment 1 of the present invention will be described with reference to the drawings. FIG. 1 is a schematic configuration diagram of the power conversion device conversion device according to embodiment 1 of the present invention.

As shown in FIG. 1, the power conversion device includes a power converter 1 as a main circuit, and a control device 20 for controlling the power converter 1. The power converter 1 performs power conversion between three-phase AC, and DC. The AC side of the power converter 1 is connected via an interconnection transformer 13 to a three-phase AC power supply 14 which is a grid as a three-phase AC circuit, and the DC side is connected via an impedance to a DC power supply 16 which is a DC grid.

The connection to the AC power supply 14 may be made via an interconnection reactor instead of the interconnect ion transformer 13. The DC side of the power converter 1 may be connected to a DC load or may be connected to another power conversion device that performs DC output.

Each phase of the power converter 1 is composed of a leg circuit 4 in which a positive arm 5 and a negative arm 6 are connected in series and an AC terminal 7 which is the connection point therebetween is connected to each phase AC line. The three leg circuits 4 are connected in parallel between positive and negative DC buses 2 and 3.

The positive arm 5 and the negative arm 6 of each leg circuit 4 are respectively composed of cell groups 5a and 6a each including one or more converter cells 10 connected in series, and a positive reactor 9p and a negative reactor 9n are provided in series in the respective arms. In this case, the positive reactor 9p and the negative reactor 9n have different reactances, and are connected on the AC terminal 7 side, to form a reactor 6 having three terminals.

The locations where the positive reactor 9p and the negative reactor 9n are provided may be any locations in the arms 5 and 6, and a plurality of reactors may be provided in each arm.

The control device 20 includes: a voltage command, generating unit 21 for generating a positive arm voltage command $V_p^+$ which is a first voltage command, and a negative arm voltage Command $V_p^-$ which is a second voltage command; and a PWM circuit 22, to generate a gate signal 22a, thereby controlling each converter cell 10 in the positive arm 5 and the negative arm 6 for each phase.

Positive arm current $ip^+$ and negative arm current $ip^-$ respectively flowing through the positive arm 5 and the negative arm 6 for each phase, and AC current ip flowing through each phase AC line are detected by a current detector (not shown) and inputted to the control device 20. Further, each phase voltage (hereinafter, referred to as AC voltage Vsp) of the AC power supply 14 detected by a voltage detector (not shown), neutral point voltage Vsn of the power converter 1, and a command value (hereinafter, a DC voltage command value Vdc) for voltage of the DC power supply 16 which is voltage between the DC buses, are inputted to the control device 20. As the AC current ip for each phase, the one calculated from the positive arm current $ip^+$ and the negative arm current $ip^-$ respectively flowing through the positive arm 5 and the negative arm 6 for each phase, may be used.

In the control device 20, the voltage command generating unit 21 generates the positive arm voltage command $V_p^+$ for the positive arm 5 for each phase, and the negative arm voltage command Vp⁻ for the negative arm 6 for each phase, on the basis of the inputted information about voltage and current. Then, the PWM circuit 22 generates the gate signal 22a through pulse width modulation control (PWM control) on the basis of each voltage command Vp⁺, Vp⁻.

The details of the configuration and operation of the control device 20 will be described later.

Figure 2:
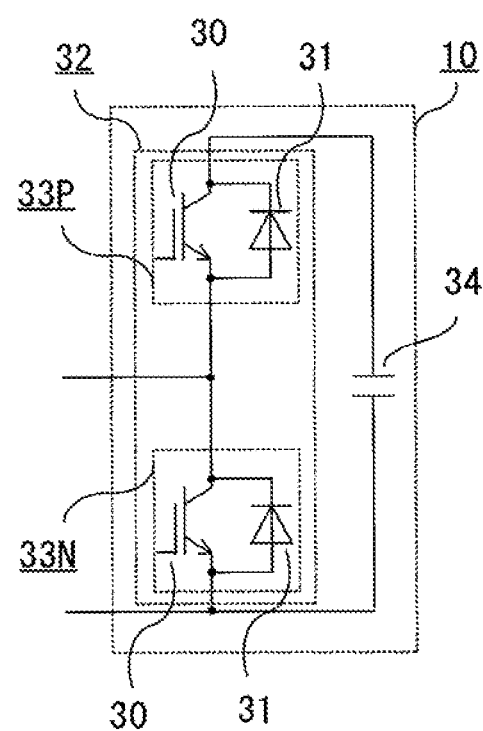
FIG. 2 is a circuit diagram showing the configuration of a converter cell according to embodiment 1 of the present invention.

FIG. 2 shows a configuration example of each converter cell 10. FIG. 2 shows the converter cell 10 in which a half-bridge configuration is employed.

The converter cell 10 in FIG. 2 is composed of a series unit 32 of a plurality of (in this case, two) semiconductor switching elements 30 (hereinafter, simply referred to as switching elements) to which diodes 31 are respectively connected in antiparallel; and a DC capacitor 34 connected in parallel to the series unit 32 and for smoothing DC voltage. Each switching element 30 is formed of a self-turn-off switching element such as an IGBT (Insulated Gate Bipolar Transistor) or a GCT (Gate Commutated Turn-off thyristor), and the diodes 31 are respectively connected in antiparallel thereto, to form switches 33P and 33N.

As shown in FIG. 2, in the converter cell 10, both terminals of the switching element 30 of the switch 33N are used as output terminals, and through ON/OFF control of the switching element 30, voltage of the DC capacitor 34 and zero voltage are outputted from the output terminals.

Figure 3:
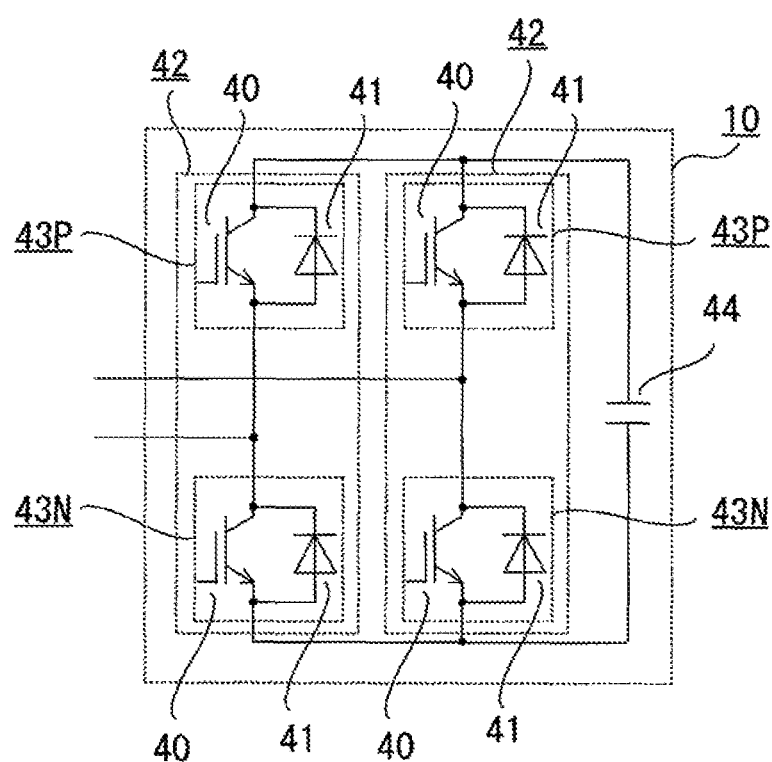
FIG. 3 is a circuit diagram showing another configuration example of the converter cell according to embodiment 1 of the present invention.

FIG. 3 shows another configuration example of each converter cell 10. FIG. 3 shows the converter cell 10 in which a full-bridge configuration is employed.

The converter cell 10 in FIG. 3 is composed of: two series units 42 connected in parallel; and a DC capacitor 44 connected in parallel to the series units 42 and for smoothing DC voltage. Each series unit 42 is composed of a plurality of (in this case, two) switching elements 40 connected in series, to which diodes 41 are respectively connected in antiparallel. Each switching element 40 is formed of a self-turn-off switching element such as an IGBT or a GCT, and the diodes 41 are respectively connected in antiparallel thereto, to form switches 43P and 43H.

As shown in FIG. 3, in the converter cell 10, terminals of the switching elements 40 corresponding to the intermediate connection points of the respective series units 42 are used as output terminals, and through ON/OFF control of the switching elements 40, positive voltage and negative voltage at both terminals of the DC capacitor 44 and zero voltage are outputted from the output terminals.

The converter cell 10 is not limited to the configurations shown in FIG. 2 and FIG. 3 as long as the converter cell 10 is composed of a series unit of a plurality of switching elements and a DC capacitor connected in parallel to the series unit, and selectively outputs voltage of the DC capacitor through switching operation.

Next, the details of the control device 20 will be described.

Since the power converter 1 outputs DC and AC, the power, converter 1 needs to be controlled both on the DC side and the AC side. Further, since circulating current izp which circulates between the positive and negative arms without contributing to the AC-side output or the DC-side output flows in the power converter 1, it is necessary to control the circulating current izp in addition to the DC-side control and the AC-side control. In this case, since the AC terminals 7 are interconnected with the AC power supply 14 of the grid, it is necessary to output AC voltage needed for the AC-side control from the power converter 1, and control of performing compensation by feeding forward the AC voltage Vsp for each phase at the AC interconnection point is performed.

Figure 4:
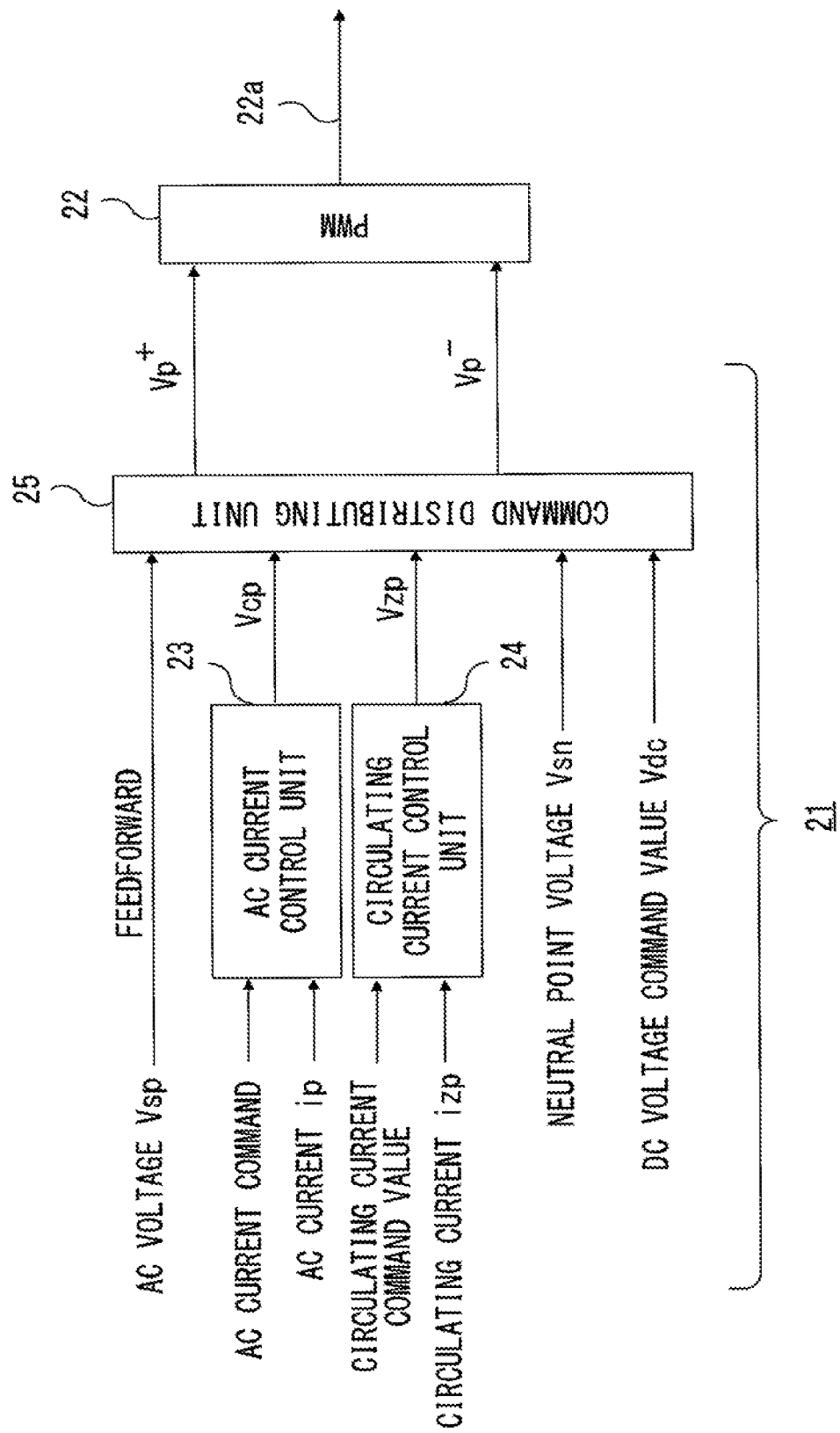
FIG. 4 is a block diagram showing a control configuration example of the power conversion device according to embodiment 1 of the present invention.
Figure 5:
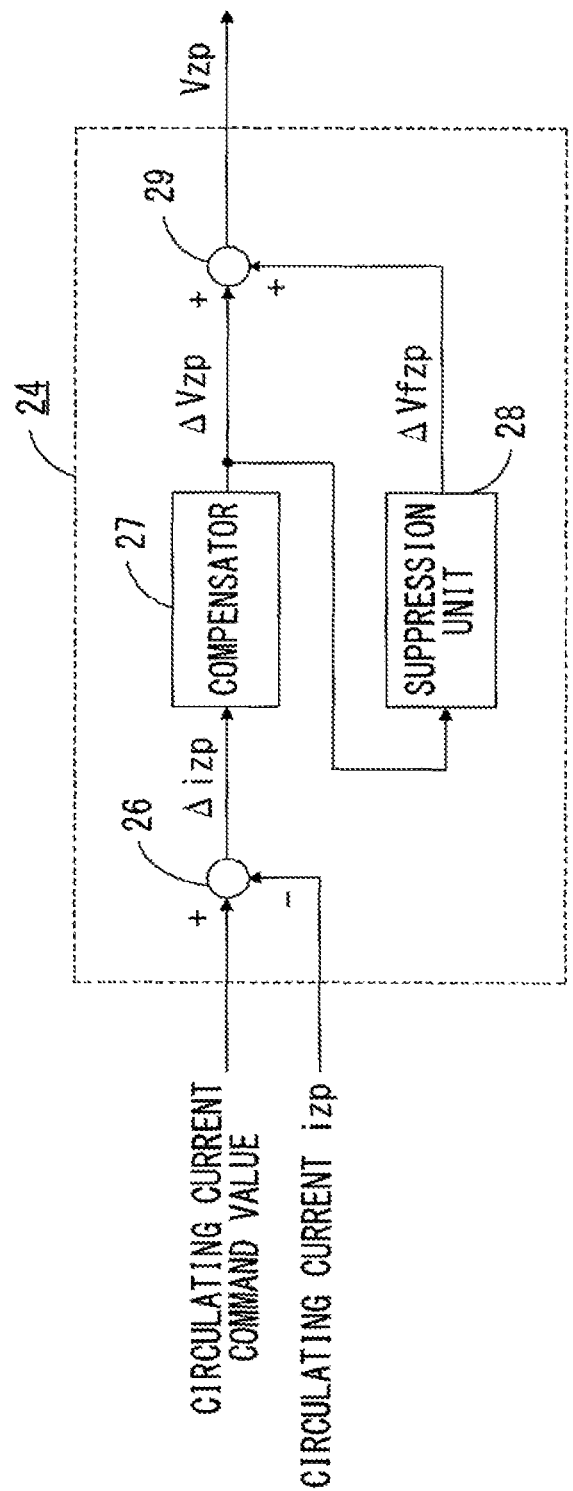
FIG. 5 is a block diagram showing a configuration example of a circulating current control unit according to embodiment 1 of the present invention.

FIG. 4 is a block diagram showing a configuration example of the control device 20. FIG. 5 shows the details of a circulating current control unit 24 in the control device 20.

As described above, the control device 20 includes the voltage command generating unit 21 and the PWM circuit 22. The voltage command generating unit 21 includes: an AC current control unit 23 for controlling the AC current ip; and the circulating current control unit 24 for controlling the circulating current izp for each phase, which circulates in the power converter 1, and further includes a command distributing unit 25 for determining the positive arm voltage command Vp⁺ and the negative arm voltage command Vp⁻ for each phase.

The AC current control unit 23 calculates an AC control command Vcp which is a voltage command so that the deviation between the detected AC current ip and a set AC current command becomes zero. That is, the AC current control unit 23 calculates the AC control command Vcp for controlling the AC current ip flowing through each phase AC line to follow the AC current command.

The circulating current control unit 24 calculates a circulation control command Vzp for controlling the circulating current izp for each phase to follow a set circulating current command value, e.g., zero. The circulating current control unit 24 includes: a compensator 27 for calculating a first control command ΔVzp so that the circulating current izp for each phase approaches the circulating current command value; a suppression unit 28 for suppressing a double-frequency component and a quadruple-frequency component of an AC fundamental wave, which are contained in the calculated first control command ΔVzp; and a subtractor 26 and an adder 29.

The circulating current izp for each phase can be calculated from the positive arm current ip⁺ and the negative arm current ip⁻ respectively flowing through the positive arm 5 and the negative arm 6 for each phase. Hereinafter, an n-th order frequency of the AC fundamental wave is referred to as nf, and an n-th order frequency component of the AC fundamental wave is referred to as an nf component.

In the circulating current control unit 24, the subtractor 26 calculates a deviation Δizp between the set circulating current command value and the circulating current izp for each phase, and the compensator 27 calculates a first control command ΔVzp which is a voltage command value so that low-frequency components of the deviation Δizp, e.g., a DC component and a 1f component become zero. Further, the suppression unit 28 calculates a second control command ΔVfzp which is a voltage command value for extracting and suppressing a 2f component and a 4f component of the first control command ΔVzp from the compensator 27. The adder 29 adds the second control command ΔVfzp to the first control command ΔVzp which is output of the compensator 27, whereby the circulation, control command Vzp is calculated.

The command distributing unit 25 receives the calculated AC control command Vcp and circulation control command Vzp, the DC voltage command value Vdc, and the neutral point voltage Vsn, and further receives the AC voltage Vsp for each phase as a feedforward term. In this case, since the AC side of the power converter 1 is connected via the interconnection transformer 13 to the AC power supply 14, the neutral point voltage Vsn is calculated from voltage of the DC power supply 16. The DC voltage command value Vdc may be given by DC output control, or may be a constant value.

In the case where the power converter 1 and the AC power supply 14 are not isolated from each other, the neutral point voltage Vsn is calculated from the AC voltage Vsp and voltage of the DC power supply 16.

On the basis of the above inputted information, the command distributing unit 25 subtracts voltage drop portions due to inductance components in the arms 5 and 6 from respective voltages assigned as outputs of the positive arm 5 and the negative arm 6, to distribute voltage components, thereby determining the positive arm voltage command Vp$^+$ for the positive arm 5 for each phase and the negative arm voltage command Vp$^-$ for the negative arm 6 for each phase.

The positive arm voltage command Vp$^+$ and the negative arm voltage command Vp$^-$ for each phase thus generated by the voltage command generating unit 21 become output voltage commands for controlling the AC current ip and the circulating current izp to respectively follow the AC current command and the circulating current command value, controlling voltage of the DC power supply 16 to be the DC voltage command value Vdc, and performing feedforward control of the AC voltage Vsp.

The PWM circuit 22 generates the gate signal 22a to perform PWM control for each converter cell 10 in the positive arm 5 and the negative arm 6 for each phase, on the basis of the positive arm voltage command Vp$^+$ and the negative arm voltage command Vp$^-$.

By the generated gate signal 22a, the switching element 30 (40) in each converter cell 10 is drive-controlled, so that output voltage of the power converter 1 is controlled to be a desired value.

Next, calculation in the command distributing unit will be described in detail below.

Figure 6:
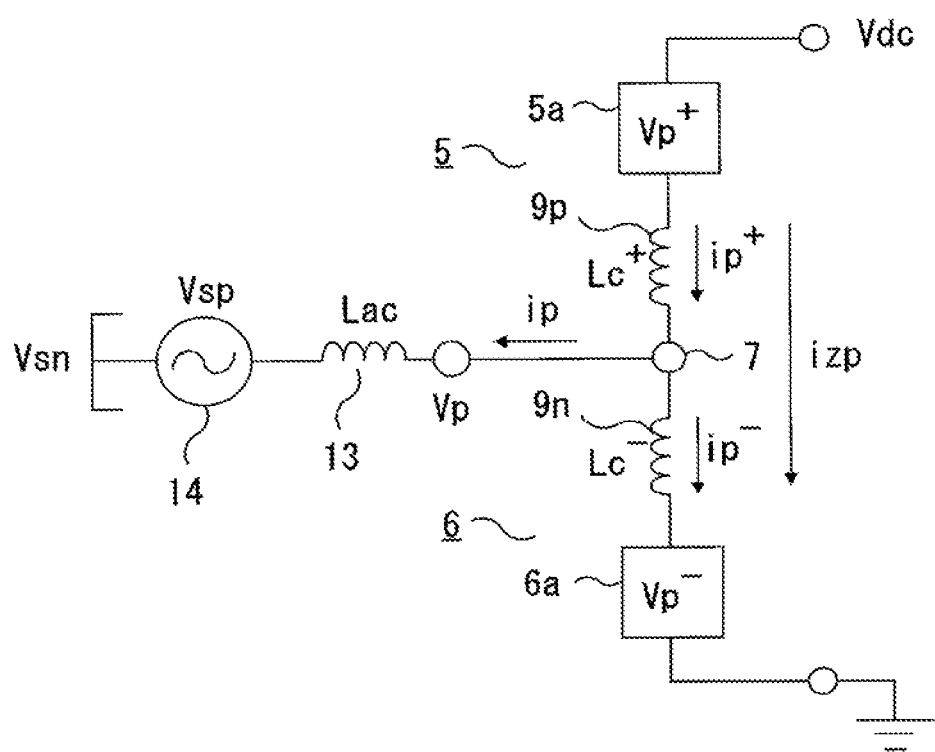
FIG. 6 is a diagram showing voltages and currents at various sections on a circuit in the power conversion device according to embodiment 1 of the present invention.

FIG. 6 is a diagram showing voltages and currents at various sections on a circuit, for one phase of the power converter 1.

Here, Lac denotes an inductance of the interconnect ion transformer 13, Lc$^+$ denotes an inductance of the positive reactor 9p, and Lc$^-$ denotes an inductance of the negative reactor 9n.

The positive arm voltage command Vp$^+$ is a command value for voltage to be outputted from the cell group 5a including the converter cells 10 connected in series in the positive arm 5, and the negative arm voltage command Vp$^-$ is a command value for voltage to be outputted from the cell group 6a including the converter cells 10 connected in series in the negative arm 6. In this case, the output voltages of the cell groups 5a and 6a are controlled to be Vp$^+$ and Vp$^-$.

In addition, voltage of the DC power supply 16 is controlled to be the DC voltage command value Vdc.

From Kirchhoff's current law, the relationship among the AC current ip, the positive arm current ip$^+$, and the negative arm current ip$^-$ is as follows.

$$ip = ip^+ - ip^-$$

The circulating current izp is defined as follows.

$$izp = (ip^+ + ip^-)/2$$

Accordingly, the positive arm current ip$^+$ and the negative arm current ip$^-$ are represented by the following Expression (1) and Expression (2).

[Mathematical 1]

Mathematical 1

$$ip^+ = \frac{ip}{2} + izp \tag{1}$$

Mathematical 2

$$ip^- = -\frac{ip}{2} + izp \tag{2}$$

In the circuit for one phase of the power converter 1 shown in FIG. 6, from Kirchhoff's voltage law on the DC side, the following expression is satisfied.

[Mathematical 3]

Mathematical 3

$$Vp^+ + Lc^+ \frac{dip^+}{dt} + Lc^- \frac{dip^-}{dt} + Vp^- = Vdc \tag{3}$$

From the Kirchhoff's voltage law on the AC side, the following expression is satisfied.

[Mathematical 4]

Mathematical 4

$$Lac \frac{dip}{dt} = Vp - (Vsp + Vsn) \tag{4}$$
$$= Lc^- \frac{dip^-}{dt} + Vp^- - (Vsp + Vsn)$$

By substituting Expression (1) and Expression (2) into Expression (3) and Expression (4) to eliminate ip$^+$ and ip$^-$ and rearranging the resultant expressions for the time derivatives of currents, the following expression is obtained.

[Mathematical 5]

Mathematical 5

$$\begin{pmatrix} Lac + \frac{Lc^-}{2} & -Lc^- \\ \frac{Lc^+ - Lc^-}{2} & Lc^+ - Lc^- \end{pmatrix} \begin{pmatrix} \frac{d}{dt}ip \\ \frac{d}{dt}izp \end{pmatrix} = \tag{5}$$
$$\begin{pmatrix} 0 & 1 \\ -1 & -1 \end{pmatrix} \begin{pmatrix} Vp^+ \\ Vp^- \end{pmatrix} + \begin{pmatrix} -(Vsp + Vsn) \\ Vdc \end{pmatrix}$$

By diagonalizing Expression (5) in order to prevent interference between the AC current ip and the circulating current izp, the following Expression (6) is obtained.

[Mathematical 6]

Mathematical 6

$$\left(Lac + \frac{Lc^+ Lc^-}{Lc^+ + Lc^-} \quad 0 \atop 0 \quad Lc^+ + Lc^-\right)\left(\frac{d}{dt}ip \atop \frac{d}{dt}izp\right) = \qquad (6)$$

$$\left(\begin{array}{cc} -\frac{Lc^-}{Lc^+ + Lc^-} & \frac{Lc^+}{Lc^+ + Lc^-} \\ -\frac{2Lac + Lc^-}{2\left(Lac + \frac{Lc^+ Lc^-}{Lc^+ + Lc^-}\right)} & -\frac{2Lac + Lc^+}{2\left(Lac + \frac{Lc^+ Lc^-}{Lc^+ + Lc^-}\right)} \end{array}\right)\left(\begin{array}{c} Vp^+ \\ Vp^- \end{array}\right) +$$

$$\left(\begin{array}{cc} -1 & \frac{Lc^-}{Lc^+ + Lc^-} \\ \frac{Lc^+ - Lc^-}{2\left(Lac + \frac{Lc^+ Lc^-}{Lc^+ + Lc^-}\right)} & \frac{2Lac + Lc^+}{2\left(Lac + \frac{Lc^+ Lc^-}{Lc^+ + Lc^-}\right)} \end{array}\right)\left(\begin{array}{c} Vsp + Vsn \\ Vdc \end{array}\right)$$

From Expression (6), it is found that the voltages $Vp^+$ and $Vp^-$ can be resolved into voltage components $Vp^+(i)$ and $Vp^-(i)$ needed for controlling current, and voltage components $Vp^+(v)$ and $Vp^-(v)$ for controlling AC voltage and DC voltage.

From Expression (5), $Vp^+(v)$ and $Vp^-(v)$ for controlling voltage are represented as follows.

[Mathematical 7]

Mathematical 7

$$\left(\begin{array}{cc} 0 & 1 \\ -1 & -1 \end{array}\right)\left(\begin{array}{c} Vp^+(v) \\ Vp^-(v) \end{array}\right) + \left(\begin{array}{c} -(Vsp + Vsn) \\ Vdc \end{array}\right) = 0 \qquad (7)$$

$$\left(\begin{array}{c} Vp^+(v) \\ Vp^-(v) \end{array}\right) = \left(\begin{array}{cc} -1 & 1 \\ 0 & 1 \end{array}\right)\left(\begin{array}{c} Vsp + Vsn \\ Vdc \end{array}\right)$$

From Expression (6), $Vp^+(i)$ and $Vp^-(i)$ for controlling current are represented as follows.

[Mathematical 8]

Mathematical 8

$$\left(Lac + \frac{Lc^+ Lc^-}{Lc^+ + Lc^-} \quad 0 \atop 0 \quad Lc^+ + Lc^-\right)\left(\frac{d}{dt}ip \atop \frac{d}{dt}izp\right) = \qquad (8)$$

$$\left(\begin{array}{cc} -\frac{Lc^-}{Lc^+ + Lc^-} & \frac{Lc^+}{Lc^+ + Lc^-} \\ \frac{2Lac + Lc^-}{2\left(Lac + \frac{Lc^+ Lc^-}{Lc^+ + Lc^-}\right)} & -\frac{2Lac + Lc^+}{2\left(Lac + \frac{Lc^+ Lc^-}{Lc^+ + Lc^-}\right)} \end{array}\right)\left(\begin{array}{c} Vp^+(i) \\ Vp^-(i) \end{array}\right)$$

In order to prevent interference between the AC control command Vcp for controlling the AC current ip to follow the AC current command and the circulation control command Vzp for controlling the circulating current izp to follow the circulating current command value, and to perform the AC current control and the circulating current control independently of each other, from Expression (8), the AC control command Vcp and the circulation control command Vzp only need to be represented by the following Expression (9).

[Mathematical 9]

Mathematical 9

$$\left(\begin{array}{cc} 1 & 0 \\ 0 & 1 \end{array}\right)\left(\begin{array}{c} Vcp \\ Vzp \end{array}\right) = \qquad (9)$$

$$\left(\begin{array}{cc} -\frac{Lc^-}{Lc^+ + Lc^-} & \frac{Lc^+}{Lc^+ + Lc^-} \\ \frac{2Lac + Lc^-}{2\left(Lac + \frac{Lc^+ Lc^-}{Lc^+ + Lc^-}\right)} & -\frac{2Lac + Lc^+}{2\left(Lac + \frac{Lc^+ Lc^-}{Lc^+ + Lc^-}\right)} \end{array}\right)\left(\begin{array}{c} Vp^+(i) \\ Vp^-(i) \end{array}\right)$$

Considering Expression (9), Expression (8) becomes the following Expression (10), and thus the AC current ip and the circulating current izp are respectively controlled by the AC control command Vcp and the circulation control command Vzp independently of each other.

[Mathematical 10]

Mathematical 10

$$\left(Lac + \frac{Lc^+ Lc^-}{Lc^+ + Lc^-} \quad 0 \atop 0 \quad Lc^+ + Lc^-\right)\left(\frac{d}{dt}ip \atop \frac{d}{dt}izp\right) = \left(\begin{array}{cc} 1 & 0 \\ 0 & 1 \end{array}\right)\left(\begin{array}{c} Vcp \\ Vzp \end{array}\right) \qquad (10)$$

From the left-hand side of Expression (10), a coefficient of a control target of the AC current control is $Lac + Lc^+ \cdot Lc^-/(Lc^+ + Lc^-)$ and a coefficient of a control target of the circulating current control is $Lc^+ + Lc^-$.

In the AC current control, not only the inductance Lac on the AC power supply 14 side with respect to the AC terminal 7 but also a parallel inductance component $(Lc^+ \cdot Lc^-/(Lc^+ + Lc^-))$ of the positive arm 5 and the negative arm 6 is a control target. That is, in the AC control command Vcp, a voltage drop portion due to the parallel inductance component is not taken into consideration.

Expression (9) is deformed into Expression (11), and from Expression (7) and Expression (11), the voltages $Vp^+$ and $Vp^-$ are represented by Expression (12).

[Mathematical 11]

Mathematical 11

$$\left(\begin{array}{c} Vp^+(i) \\ Vp^-(i) \end{array}\right) = \left(\begin{array}{cc} -\frac{2Lac + Lc^+}{2\left(Lac + \frac{Lc^+ Lc^-}{Lc^+ + Lc^-}\right)} & -\frac{Lc^+}{Lc^+ + Lc^-} \\ -\frac{2Lac + Lc^-}{2\left(Lac + \frac{Lc^+ Lc^-}{Lc^+ + Lc^-}\right)} & -\frac{Lc^-}{Lc^+ + Lc^-} \end{array}\right)\left(\begin{array}{c} Vcp \\ Vzp \end{array}\right) \qquad (11)$$

[Mathematical 12]

$$\begin{pmatrix} Vp^+ \\ Vp^- \end{pmatrix} = \begin{pmatrix} Vp^+(i) + Vp^+(v) \\ Vp^-(i) + Vp^-(v) \end{pmatrix} \quad (12)$$

$$= \begin{pmatrix} -\dfrac{2Lac + Lc^+}{2\left(Lac + \dfrac{Lc^+Lc^-}{Lc^+ + Lc^-}\right)} & -\dfrac{Lc^+}{Lc^+ + Lc^-} \\ \dfrac{2Lac + Lc^-}{2\left(Lac + \dfrac{Lc^+Lc^-}{Lc^+ + Lc^-}\right)} & -\dfrac{Lc^-}{Lc^+ + Lc^-} \end{pmatrix} \begin{pmatrix} Vcp \\ Vzp \end{pmatrix} +$$

$$\begin{pmatrix} -1 & 1 \\ 0 & 1 \end{pmatrix} \begin{pmatrix} Vsp + Vsn \\ Vdc \end{pmatrix}$$

In the command distributing unit 25, the voltages $Vp^+$ and $Vp^-$ represented by Expression (12) are used for the positive arm voltage command $Vp^+$ and the negative arm voltage command $Vp^-$.

The positive arm voltage command $Vp^+$ and the negative arm voltage command $Vp^-$ satisfy Expression (3), that is, are voltages obtained by subtracting voltage drop portions due to the inductance components in the arms 5 and 6 from respective voltages assigned as outputs of the positive arm 5 and the negative arm 6. Here, the inductance components involved with the voltage drop portions are inductance components from which the parallel inductance component of the arms 5 and 6 has been removed.

In $Vp^+$ and $Vp^-$ shown in Expression (12), voltage components regarding the AC control command Vcp for controlling the AC current ip are voltages obtained by multiplying the AC control command Vcp by coefficients. Since the AC current ip flows through the interconnection transformer 13, the positive reactor 9p, and the negative reactor 9n, the coefficients of the AC control command Vcp are calculated from the inductances Lac, $Lc^+$, and $Lc^-$ of the interconnection transformer 13, the positive reactor 9p, and the negative reactor 9n. For the positive arm voltage command $Vp^+$, a negative coefficient is applied to the AC control command Vcp, and for the negative arm voltage command $Vp^-$, a positive coefficient is applied to the AC control command Vcp.

Since the AC current ip flows through the positive arm 5 and the negative arm 6 in directions opposite to each other, the voltage components regarding the AC control command Vcp for the positive arm 5 and the negative arm 6 have polarities opposite to each other.

In $Vp^+$ and $Vp^-$ shown in Expression (12), a voltage component regarding the circulation control command Vzp for controlling the circulating current izp is voltage obtained by multiplying the circulation control command Vzp by a coefficient. Since the circulating current izp flowing between the positive arm 5 and the negative arm 6 flows through the positive reactor 9p and the negative reactor 9n, the coefficient of the circulation control command Vzp is calculated from the inductances $Lc^+$ and $Lc^-$ of the positive reactor 9p and the negative reactor 9n. For the positive arm voltage command $Vp^+$ and the negative arm voltage command $Vp^-$, coefficients having the same polarity are applied to the circulation control command Vzp.

Since the circulating current izp flows through the positive arm 5 and the negative arm 6 in the same direction, the voltage components regarding the circulation control command Vzp for the positive arm 5 and the negative arm 6 have the same polarity.

The voltage components regarding the AC voltage Vsp and the neutral point voltage Vsn have a negative polarity for the positive arm 5, and a positive polarity for the negative arm 6, as in the voltage components regarding the AC control command Vcp. In this case, the coefficients for the positive arm 5 and the negative arm 6 have the same magnitude of 1.

The voltage component regarding the DC voltage command value Vdc is only voltage for the positive arm 5, and the coefficient thereof is 1.

As described above, the control device 20 generates the positive arm voltage command $Vp^+$ and the negative arm voltage command $Vp^-$ for each phase, to perform PWM control for each converter cell 10. In generation of the positive arm voltage command $Vp^+$ and the negative arm voltage command $Vp^-$, the circulating current control unit 24 which, controls the circulating current izp for each phase to follow the circulating current command value, performs control to suppress, in particular, a 2f component and a 4f component.

Hereinafter, this circulating current control, and a 2f component and a 4f component occurring in the circulating current izp will be described in detail.

First, a current component flowing through the power converter 1 will be described. Since the power converter 1 outputs DC current and AC current, current flowing through, the power converter 1 mainly contains two components of a DC component and an AC fundamental wave component. Therefore, each of the positive arm current $ip^+$ and the negative arm current $ip^-$ also mainly contains two components of a DC component and an AC fundamental wave component. The DC components of currents of $ip^+$ and $ip^-$ have the same magnitude and the same polarity, and the AC fundamental wave components of currents of $ip^+$ and $ip^-$ have the same magnitude and have polarities opposite to each other.

Next, a voltage component outputted from the power converter 1 will, fee described. Since the power converter 1 outputs DC current and AC current, voltage outputted from the power converter 1 also mainly contains two components of a DC component and an AC fundamental wave component. Therefore, each of voltage $Vp^+$ outputted from the cell group 5a in the positive arm 5 and voltage $Vp^+$ outputted from the cell group 6a in the negative arm 6 also mainly contains two components of a DC component and an AC fundamental wave component.

The DC components of voltages of $Vp^+$ and $Vp^-$ have the same magnitude and the same polarity.

As for the AC fundamental wave components of voltages, arm voltages of the positive, arm 5 and the negative arm 6 have components having the same magnitude and polarities opposite to each other. The arm voltage is the sum of voltage $Vp^+$, $Vp^-$ outputted from the cell group 5a, 6a and voltage of the reactor 9p, 9n. Since the fundamental wave components of the arm currents $ip^+$ and $ip^-$ flowing through the reactors 9p and 9n have the same magnitude, if the inductance $Lc^+$ of the positive reactor 9p and the inductance $Lc^-$ of the negative reactor 9n are different from each other, a deviation occurs between voltages of the reactors 9p and 9n, and the AC fundamental wave components of voltages $Vp^+$ and $Vp^-$ outputted from the cell groups 5a and 6a have different magnitudes and opposite polarities.

It is noted that, if the voltages of the reactors 9p and 9n of the positive arts 5 and the negative arm 6 are equal to each other the AC fundamental wave components of voltages $Vp^+$ and $Vp^-$ have the same magnitude and have polarities opposite to each other.

Next, oscillation components will be described which are caused by the DC components and the AC fundamental wave components of the voltages $Vp^+$ and $Vp^-$ outputted from the cell groups 5a and 6a, and the DC components and the AC fundamental wave components of the arm currents $ip^+$ and $ip^-$ flowing through the cell groups 5a and 6a. The oscillation components include minute amount of harmonic oscillation occurring on the voltages $Vp^+$ and $Vp^-$, minute amount of harmonic oscillation occurring on the arm currents $ip^+$ and $ip^-$, and harmonic oscillation of the DC capacitor voltage (voltage of DC capacitor 34, 44) in each converter cell 10. Further, a harmonic component of the circulating current izp caused by these oscillations, a harmonic component outputted to the AC side, and a harmonic component outputted to the DC side will also be described.

Specifically, a 2f component of the DC capacitor voltage, a 3f component of the DC current, a 2f component and a 4f component of the circulating current izp, and a 2f component and a 4f component of the AC current ip will be described.

In the positive arm 5 and the negative arm 6, currents of AC fundamental wave components (if component) having opposite polarities between positive and negative flow. In addition, since voltages of 1f having opposite polarities between positive and negative are generated in the positive arm 5 and the negative arm 6, 1f components having opposite polarities between positive and negative exist in the modulation signal which is the voltage commands (positive arm voltage command $Vp^+$ and negative arm voltage command $Vp^-$). It is noted that the case where the positive arm 5 and the negative arm 6 have polarities opposite to each other is simply referred to as opposite polarities between positive and negative, and the case where the positive arm 5 and the negative arm 6 have the same polarity is simply referred to as the same polarity between positive and negative.

Due to the 1f current components having opposite polarities between positive and negative and the 1f modulation signal having opposite polarities between positive and negative, 2f power pulsations having the same polarity between positive and negative occur, and current of 2f component flows through the DC capacitor 34, 44 in each converter cell 10. Thus, the DC capacitor voltages also oscillate as 2f components having the same polarity between positive and negative.

In addition, since the power converter 1 generates DC voltages having the same polarity between positive and negative, DC components having the same polarity between positive and negative exist in the modulation signal. Due to the DC components having the same polarity between positive and negative in the modulation signal and the 2f components having the same polarity between positive and negative in the DC capacitor voltages, 2f voltage oscillations having the same polarity between positive and negative occur, and the 2f voltage oscillations are applied to the reactors 9p and 9n, so that 2f oscillations having the same polarity between positive and negative occur in the arm currents $ip^+$ and $ip^-$. Since the 2f current oscillations have the same polarity between positive and negative, the 2f current oscillations become the circulating current izp, that is, 2f oscillation occurs in the circulating current izp.

Due to the 2f current components having the same polarity between positive and negative and the 1f modulation signal having opposite polarities between positive and negative, 3f power pulsations having opposite polarities between positive and negative occur, and current of 3f component flows in the DC capacitor 34, 44 in each converter cell 10.

Thus, the DC capacitor voltages also oscillate as 3f components having opposite polarities between positive and negative.

Due to the 3f components having opposite polarities between positive and negative in the DC capacitor voltages and the 1f modulation signal having opposite polarities between positive and negative, 4f voltage oscillations having the same polarity between positive and negative occur, and the 4f voltage oscillations are applied to the reactors 9p and 9n, so that 4f oscillations having the same polarity between positive and negative occur in the arm currents $ip^+$ and $ip^-$. Since the 4f current oscillations have the same polarity between positive and negative, the 4f current oscillations become the circulating current izp, that is, 4f oscillation occurs in the circulating current izp.

In addition, due to the 3f components having opposite polarities between positive and negative in the DC capacitor voltages and DC components having the same polarity between positive and negative in the modulation signal, 3f voltage oscillations having opposite polarities between positive and negative occur.

The 2f oscillation and the 4f oscillation in the circulating current izp, and the 3f voltage oscillation, which occur as described above, cause the following influence.

If the inductance $Lc^+$ of the positive reactor 9p and the inductance $Lc^-$ of the negative reactor 9n are equal to each other, the magnitude of each of the 2f oscillation and the 4f oscillation in the circulating current izp is the same between the positive arm current $ip^+$ and the negative arm current $ip^-$, and therefore all the components become the circulating current izp and are not outputted to the AC side.

In this case, since the inductance $Lc^+$ of the positive reactor 9p and the inductance $Lc^-$ of the negative reactor 9n are different front each other, each of the 2f oscillation and the 4f oscillation in the circulating current izp has a magnitude slightly different between the positive arm current $ip^+$ and the negative area current $ip^-$. Thus, the differential current is outputted to the AC side, and harmonic components of 2f and 4f flow out to the AC current ip.

Also for the 3f voltage oscillation, if the inductances $Lc^+$ and $Lc^-$ of the reactors 9p and 9n are equal to each other, output voltages of the cell groups 5a and 6a have the same magnitude and have polarities opposite to each other, and therefore there is no influence on the output side.

In this case, since the inductance $Lc^+$ and $Lc^-$ of the reactors 9p and 9n are different from each other, output voltages of the cell groups 5a and 6a have different magnitudes, and 3f voltage fluctuation flows out to the output side. Since the 3f voltage fluctuation is a component common among the three phases, the 3f voltage fluctuation flows out to the DC side. Thus, harmonic voltage of 3f is applied to the DC side, whereby 3f harmonic current flows through the DC current path.

As described above, as oscillation components, the harmonic components of 2f and 4f flow out to the AG current ip and the harmonic component of 3f flows out to the DC current. As is found from the occurrence factors described above, these oscillation components can be suppressed by suppressing the 2f component and the 4f component of the circulating current izp.

In the present embodiment, as described above, in the circulating current control unit 24, the compensator 27 calculates the first control command ΔVzp so that the circulating current izp for each phase approaches the circulating current command value, the suppression unit 28 generates the second control command ΔVfzp so as to suppress a 2f component and a 4f component contained in the first control command ΔVzp, and then the first control command ΔVzp and the second control command ΔVfzp are combined to generate the circulation control command Vzp. Thus, the circulation control command Vzp has a great sensitivity to the 2f component and the 4f component, whereby the 2f component and the 4f component of the circulating current izp can be effectively suppressed.

Thus, flowing out of harmonic components of 2f and 4f to the AC current ip can be suppressed, and flowing out of a harmonic component of 3f to the DC current can be suppressed.

In the case where the resonance frequency of the DC circuit connected via the DC buses 2 and 3 is low, in particular, close to 3f, harmonic current of 3f flowing out to the DC circuit becomes a great component to cause great oscillation. In the present embodiment, since control is performed so as to suppress the 2f component and the 4f component of the circulating current izp, flowing out of a harmonic component of 3f to the DC current can be suppressed, whereby current oscillation in the DC circuit can be suppressed.

At the same time, flowing out of harmonic components of 2f and 4f to the AC current ip can be suppressed, whereby the reliability of the control is improved.

Further, in the case of the power conversion device connected to the DC grid (DC power supply 16) and used for DC power transmission, since current oscillation in the DC current can be suppressed, the reliability of the control can be significantly improved.

In addition, the control device 20 subtracts voltage drop portions due to the inductance components in the arms 5 and 6, from respective voltages assigned as outputs of the positive arm 5 and the negative arm 6 of the power converter 1, to distribute voltage components, thereby determining the positive arm voltage command Vp⁺ for the positive aria 5 for each phase and the negative arm voltage command Vp⁺ for the negative arm 6 for each phase. Thus, even if the inductance components in the arms 5 and 6 are different from, each other, interference does not occur between the current control for the AC current, ip and the current control for the circulating current izp, and the power converter 1 is controlled stably and reliably. In addition, since interference does not occur between the current control for the AC current ip and the current control for the circulating current izp, the control for suppressing a 2f component and a 4f component of the circulating current izp can be effectively performed.

Although, in the above embodiment, the inductance Lc⁺ of the positive reactor 9p and the inductance Lc⁺ of the negative reactor 9n are different from each other, only one of the arms 5 and 6 may be provided with a reactor. In addition, the effect is provided also in the case where the inductance components in the arms 5 and 6 are different due to a factor other than the inductances of the reactors 9p and 9n themselves.

In the above embodiment, the case where the positive arm 5 and the negative arm 6 are connected in series and the AC terminal 7 which is the connection point therebetween is connected to each phase AC line, has been shown. However, the connection to each phase AC line may be made via a transformer without providing the AC terminal 7. In this case, if the primary side of the transformer is connected to each phase AC line, for example, the positive arm 5 and the negative arm 6 for each phase of the power converter 1 are connected in series via the secondary winding for each phase of the transformer.

In the above embodiment, the case of suppressing a 2f component and a 4f component of the circulating current izp has been shown. However, the suppression unit 28 may perform control, so as to suppress only one of the 2f component and the 4f component. In this case, flowing out of a harmonic component of the suppression target (one of the 2f component and the 4f component) to the AC current ip can be suppressed. Although the effect is reduced as compared to the case of suppressing both of the 2f component and the 4f component, flowing out of a harmonic component of 3f to the DC current can be suppressed.

In the above embodiment, the AC side of the power converter 1 is interconnected to the grid, and the control device 20 performs control of feeding forward the AC voltage Vsp. However, the AC side of the power converter 1 may be connected to another AC circuit, and the feedforward control of the AC voltage Vsp may not be performed.

Embodiment 2

Figure 7:
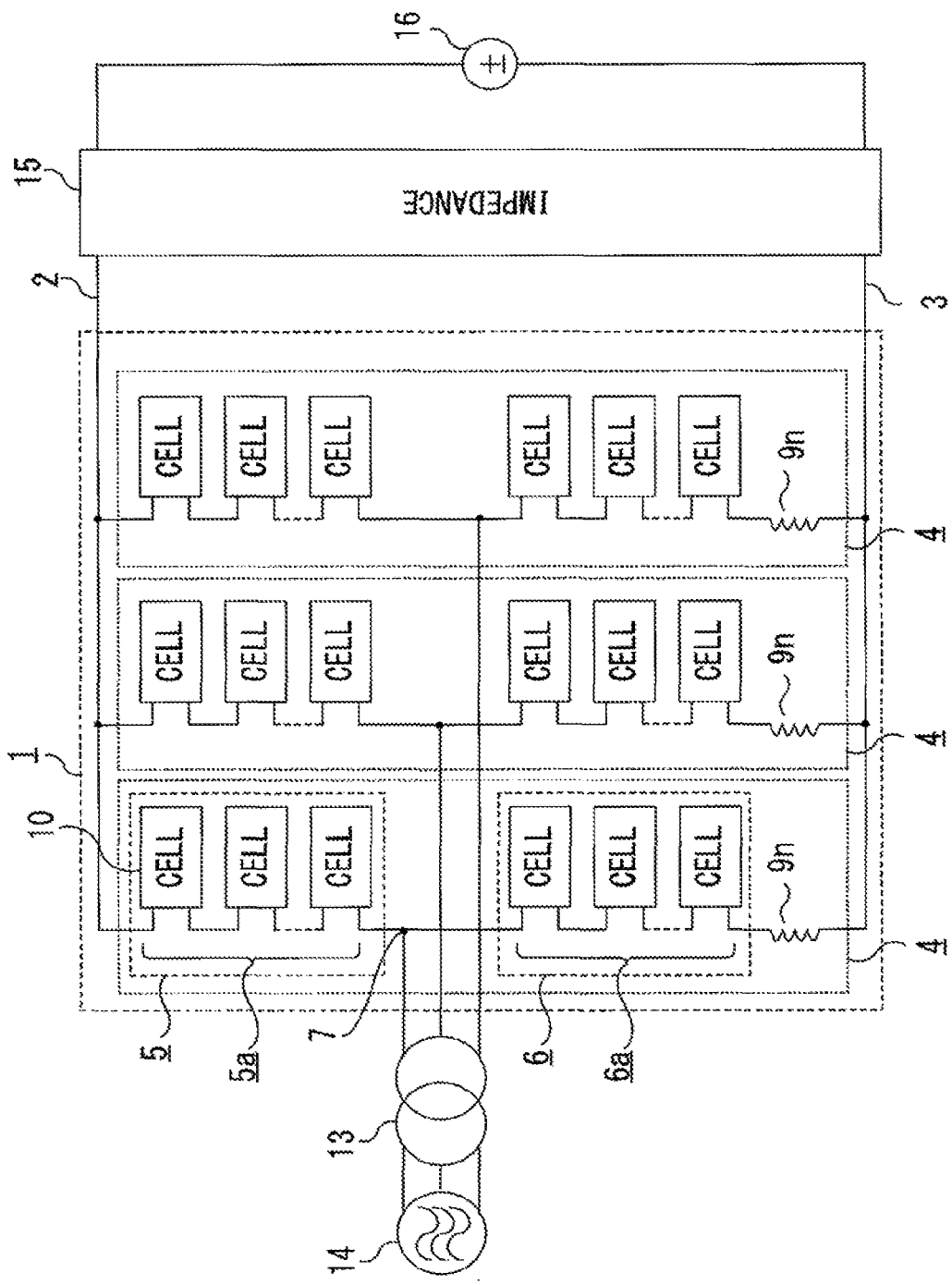
FIG. 7 is a schematic configuration diagram of a power conversion device according to embodiment 2 of the present invention.

Next, a power conversion device according to embodiment 2 of the present invention will be described below on the basis of FIG. 7. FIG. 7 is a schematic configuration diagram of the power conversion device according to embodiment 2 of the present invention.

In the present embodiment 2, the positive arm 5 and the negative arm 6 of each leg circuit 4 are respectively composed of the cell groups 5a and 6a each including one or more converter cells 10 connected in series, and only for the negative arm 6, the negative reactor 9n is provided in series on the negative side of the cell group 6a. The other configuration is the same as that in the above embodiment 1 shown in FIG. 1.

For convenience sake, the control device 20 is not shown in FIG. 7.

The configuration of the control device 20 is the same as that in the above embodiment 1 shown in FIG. 4 and FIG. 5. However, in this case, since the positive reactor 9p is not provided, calculation in the command distributing unit 25 is different as shown below.

By setting the inductance Lc⁺ at zero and deforming Expression (12) in the above embodiment 1, the following Expression (13) is obtained.

[Mathematical 13]

Mathematical 13

$$\begin{pmatrix} Vp^+ \\ Vp^- \end{pmatrix} = \begin{pmatrix} -1 & 0 \\ 1 + \dfrac{Lc^-}{Lac} & -1 \end{pmatrix} \begin{pmatrix} Vcp \\ Vzp \end{pmatrix} + \begin{pmatrix} -1 & 1 \\ 1 & 0 \end{pmatrix} \begin{pmatrix} Vsp + Vsn \\ Vdc \end{pmatrix} \quad (13)$$

In the command distributing unit 25, voltages Vp⁺ and Vp⁻ shown in Expression (13) are used for the positive arm voltage command Vp⁺ and the negative arm voltage command Vp⁻.

Also in this embodiment, interference does not occur, between the current control for the AG current ip and the current control for the circulating current izp, and the control for suppressing a 2f component and a 4f component of the circulating current izp can be effectively performed. Thus, the same effect as in the above embodiment 1 is obtained.

Further, in the leg circuit 4 for each phase of the power converter 1, a reactor (negative reactor 9n) is provided only on the negative side of the cell group 6a of the negative arm 6. Therefore, the negative reactor 9n may be a small-size element with a low withstand voltage property, and thus the power converter 1 has a configuration suitable for downsizing.

Thus, the positive arm voltage command Vp⁺ and the negative arm voltage command Vp⁻ for the power converter 1 suitable for downsizing are reliably generated.

The negative reactor 9n may be provided on the positive side of the cell group 6a of the negative arm 6, and as in the above embodiment 2, the control device 20 generates the positive arm voltage command Vp⁺ and the negative arm voltage command Vp⁻ to control the power converter 1.

The control of the command distributing unit 25 of the control device 20 is not limited to those shown in the above embodiments 1 and 2, and also in such other cases, a 2f component and a 4f component of the circulating current izp can be suppressed by the control of the circulating current control unit 24.

Embodiment 3

Next, embodiment 3 of the present invention will be described below. In the present embodiment 3, a configuration example of the suppression unit 28 in the circulating current control unit 24 according to the above embodiment 1 will be described below on the basis of FIG. 8.

Figure 8:
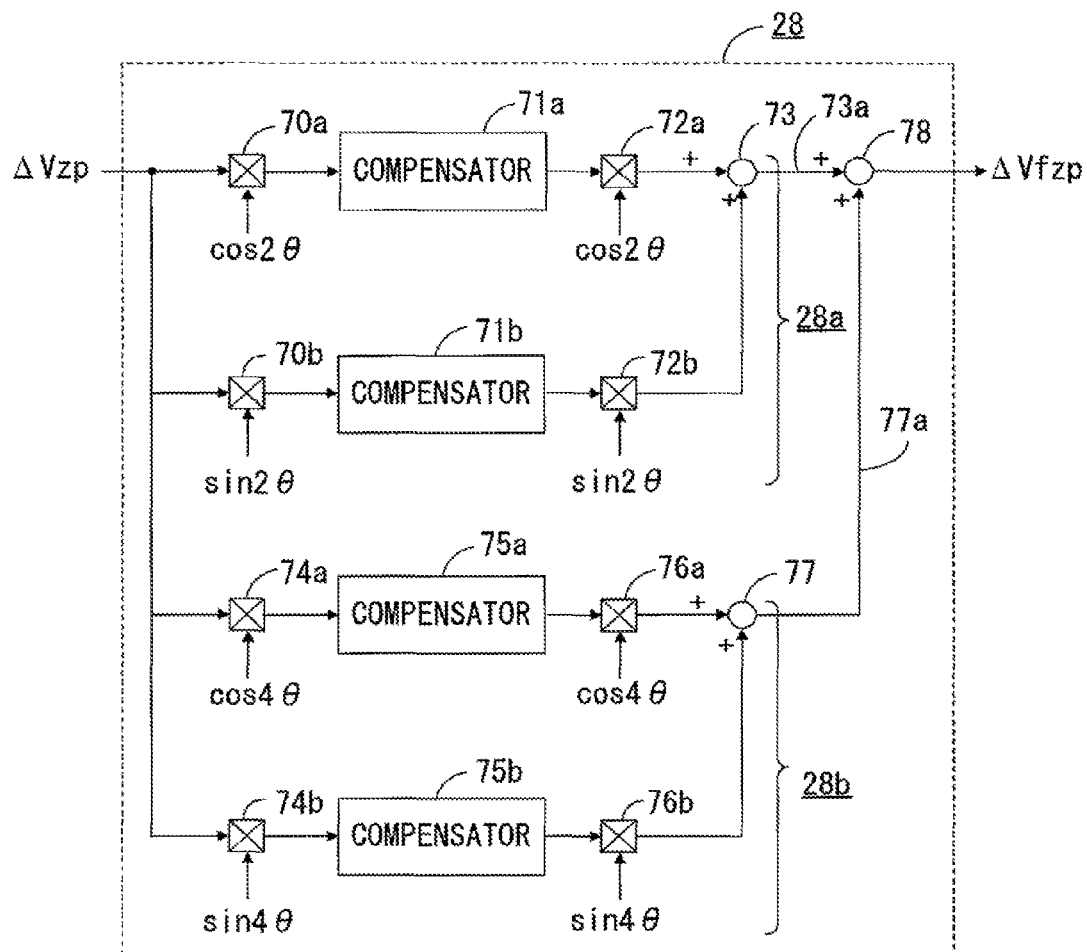
FIG. 8 is a block diagram showing a control configuration example of a suppression unit according to embodiment 3 of the present invention.

As shown in FIG. 8, the suppression unit 28 includes a 2f component suppression unit 28a and a 4f component suppression unit 28b, and generates a second control command ΔVfzp by an adder 78 adding a voltage command 73a calculated by the 2f component suppression unit 28a and a voltage command 77a calculated by the 4f component suppression unit 28b.

The 2f component suppression unit 28a includes: a compensator 71a which is a first cosine compensator for suppressing a cosine component, of the 2f component; a compensator 71b which is a first sine compensator for suppressing a sine component of the 2f component; multipliers 70a, 70b, 72a, 72b; and an adder 73. The 4f component suppression unit 28b includes: a compensator 75a which is a second cosine compensator for suppressing a cosine component of the 4f component; a compensator 75b which is a second sine compensator for suppressing a sine component of the 4f component; multipliers 74a, 74b, 76a, 76b; and an adder 77.

As described in the above embodiment 1, the suppression unit 28 receives the first control command ΔVzp calculated by the compensator 27 so that the circulating current izp for each phase approaches the circulating current command value.

In the 2f component suppression unit 28a in the suppression unit 28, the multipliers 70a and 70b respectively multiply the first control command ΔVzp by the cosine and the sine of 2θ which is twice the fundamental wave phase θ of the AC voltage, thereby changing the cosine component and the sine component of the 2f component to DC components. The outputs of the multipliers 70a and 70b are respectively inputted to the compensators 71a and 71b, and the compensators 71a and 71b calculate voltage command components so that the inputted DC components become zero. Then, the multipliers 72a and 72b respectively multiply the above calculation results by the cosine and the sine of 2θ again, and the adder 73 adds the outputs of the multipliers 72a and 72b, thereby obtaining the voltage command 73a.

In the 4f component suppression unit 28b in the suppression unit 28, the multipliers 74a and 74b respectively multiply the first control command ΔVzp by the cosine and the sine of 4θ which is four times the fundamental wave phase θ of the AC voltage, thereby changing the cosine component and the sine component of the 4f component to DC components. The outputs of the multipliers 74a and 74b are respectively inputted to the compensators 75a and 75b, and the compensators 75a and 75b calculate voltage command components so that the inputted DC components become zero. Then, the multipliers 76a and 76b respectively multiply the above calculation results by the cosine and the sine of 4θ again, and the adder 77 adds the outputs of the multipliers 76a and 76b, thereby obtaining the voltage command 77a.

Then, the adder 78 adds the two voltage commands 73a and 77a, thereby generating the second control command ΔVfzp.

Each compensator 71a, 71b, 75a, 75b can ensure the suppression capability by increasing the gain for the DC components.

For example, each compensator 71a, 71b, 75a, 75b may be configured using integral control that makes the DC gain infinite, whereby the target component can be effectively suppressed. In this case, the compensator 27 for generating the first control command ΔVzp in the circulating current control unit 24 may be configured using proportional control.

As described above, in the present embodiment 3, the suppression unit 28 is configured to extract and suppress the cosine component and the sine component of a 2f component and a 4f component of the circulating current izp, whereby the capability of suppression of the 2f component and the 4f component is improved. Thus, harmonic components of the 2f component and the 4f component flowing out to the AC current ip, and a harmonic component of 3f flowing out to the DC current, can be effectively and reliably suppressed.

The suppression unit 28 may include only one of the 2f component suppression unit 28a and the 4f component suppression unit 28b. For example, in the case of providing only the 2f component suppression unit 28a, the voltage command 73a calculated by the 2f component suppression unit 28a becomes the second control command ΔVfzp, and in the case of providing only the 4f component suppression unit 28b, the voltage command 77a calculated by the 4f component suppression unit 28b becomes the second control command ΔVfzp.

Embodiment 4

Next, embodiment 4 of the present invention will be described below. In the present embodiment 4, still another configuration of the suppression unit 28 in the circulating current control unit 24 according to the above embodiment 1 will be described below on the basis of FIG. 9.

Figure 9:
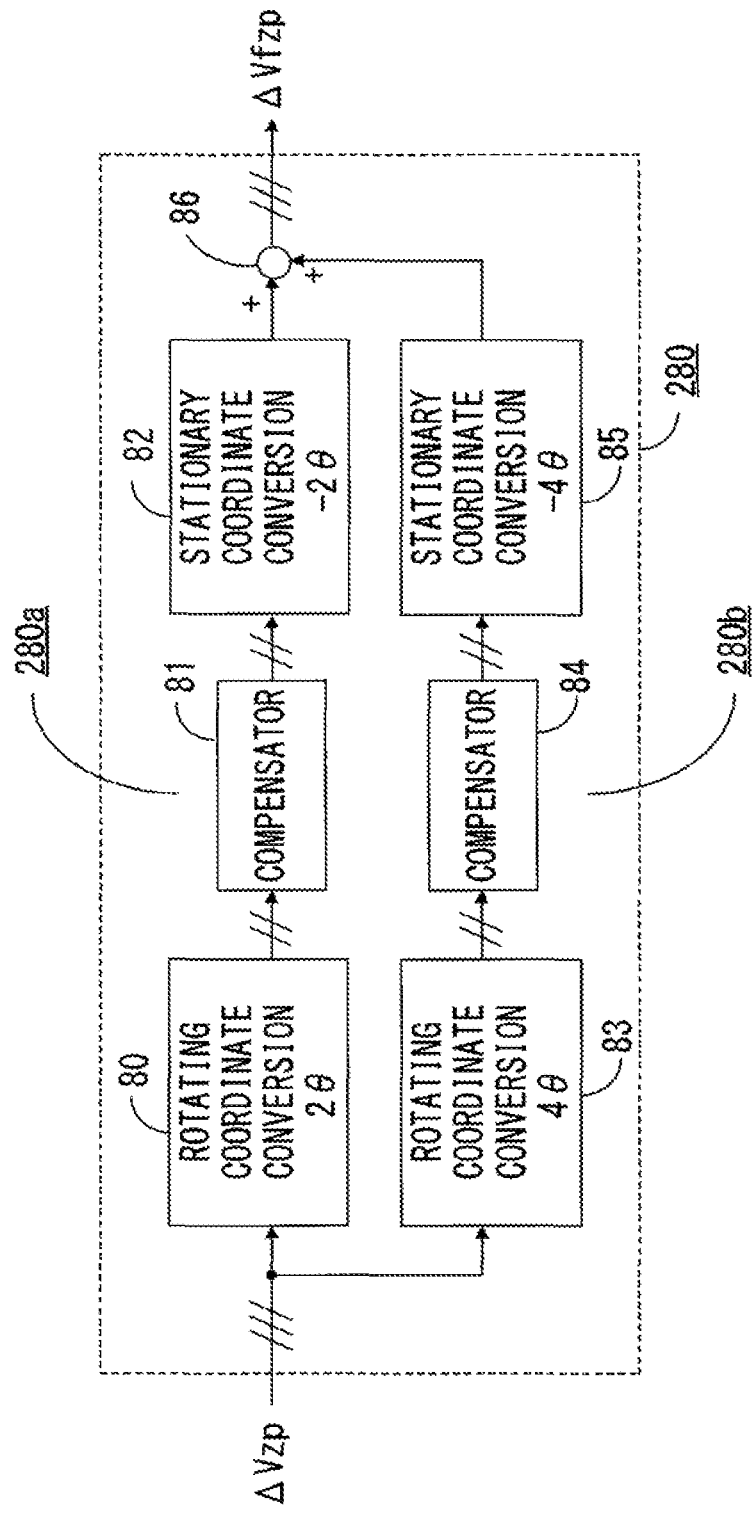
FIG. 9 is a block diagram showing a control configuration example of a suppression unit according to embodiment 4 of the present invention.

As shown in FIG. 9, a suppression unit 280 includes a 2f component suppression unit 280a and a 4f component suppression unit 280b, and generates a second control command ΔVfzp by an adder 86 adding a calculation result of the 2f component suppression unit 280a and a calculation result of the 4f component suppression unit 28b.

The 2f component suppression unit 280a includes: a rotating coordinate conversion unit 80 which is a first rotating coordinate conversion unit for extracting a 2f component; a compensator 81; and a stationary coordinate conversion unit 82 which is a first stationary coordinate conversion unit. The 4f component suppression unit 280b includes: a rotating coordinate conversion unit 83 which is a second rotating coordinate conversion unit for extracting a 4f component; a compensator 84; and a stationary coordinate conversion unit 85 which is a second stationary coordinate conversion unit.

As described in the above embodiment 1, the suppression unit 28 receives the first control command ΔVsp calculated by the compensator 27 so that the circulating current izp for each phase approaches the circulating current command value.

In the 2f component suppression unit 280a in the suppression unit 280, the rotating coordinate conversion unit 80 performs rotating coordinate conversion of the inputted first control command ΔVzp (ΔVzu, ΔVzv, ΔVzw) by 2θ which is twice the fundamental wave phase θ of the AC voltage, thereby converting a 2f component of the first control command ΔVzp into two orthogonal DC components (having phases different from each other by 90 degrees). The output of the rotating coordinate conversion unit 80 is inputted to the compensator 81, and the compensator 81 calculates two voltage command components so that the inputted two DC components become zero. Then, the stationary coordinate conversion unit 82 performs, for the calculated two voltage command components, stationary coordinate conversion by −2θ, i.e., inverse conversion of the preceding rotating coordinate conversion, thereby calculating a voltage command for suppressing the 2f component for each phase.

In the 4f component suppression unit 280b in the suppression unit 280, the rotating coordinate conversion unit 83 performs rotating coordinate conversion of the inputted first control command ΔVzp (ΔVzu, ΔVzv, ΔVzw) by 4θ which is four times the fundamental wave phase θ of the AC voltage, thereby converting a 4f component of the first control command ΔVzp into two orthogonal DC components (having phases different from each other by 90 degrees). The output of the rotating coordinate conversion unit 83 is inputted to the compensator 84, and the compensator 84 calculates two voltage command components so that the inputted two DC components become zero. Then, the stationary coordinate conversion unit 85 performs, for the calculated two voltage command components, stationary coordinate conversion by −4θ, i.e., inverse conversion of the preceding rotating coordinate conversion, thereby calculating a voltage command for suppressing a 4f component for each phase.

Then, the adder 86 adds the voltage command for suppressing the 2f component for each phase and the voltage command for suppressing the 4f component for each phase, thereby generating the second control command ΔVfzp.

Each compensator 81, 84 can ensure the suppression capacity by increasing the gain for the DC components.

For example, each compensator 81, 84 may be configured using integral control that makes the DC gain infinite, whereby the target component can be effectively suppressed. In this case, the compensator 27 for generating the first, control command ΔVzp in the circulating current control unit 24 may be configured using proportional control.

As described above, in the present embodiment 4, the suppression, unit 280 is configured to detect a 2f component and a 4f component, of the circulating current izp, as DC components, using the rotating coordinate conversion, and to suppress the 2f component and the 4f component, whereby the capability of suppression of the 2f component and the 4f component is improved. Thus, harmonic components of the 2f component and the 4f component flowing out to the AC current ip, and a harmonic component of 3f flowing out to the DC current, can be effectively and reliably suppressed.

Also in this case, the suppression unit 280 may include only one of the 2f component suppression unit 280a and the 4f component suppression unit 280b. For example, in the case of providing only the 2f component suppression unit 280a, the voltage command calculated by the 2f component suppression unit 280a becomes the second control command ΔVfzp, and in the case of providing only the 4f component suppression unit 280b, the voltage command calculated by the 4f component suppression unit 280b becomes the second control command ΔVfzp.

It is noted that, within the scope of the present invention, the above embodiments may be freely combined with each other, or each of the above embodiments may be modified or simplified as appropriate.

The invention claimed is:

1. A power conversion device comprising:
a power converter for performing power conversion between three-phase AC, and DC, the power converter including a plurality of leg circuits each having a positive arm and a negative arm connected in series, outputs of the positive arm and the negative arm being connected to each phase AC line, the plurality of leg circuits being connected in parallel between positive and negative DC buses; and
a control device for controlling the power converter, wherein
each of the positive arm and the negative arm of each leg circuit is composed of one or a plurality of converter cells connected in series and including: a series unit of a plurality of semiconductor switching elements connected in series to each other; and a DC capacitor connected in parallel to the series unit,
the control device includes a voltage command generating unit for generating a first voltage command for the positive arm and a second voltage command for the negative arm, to perform output control for each converter cell in the positive arm and the negative arm by PWM control,
the voltage command generating unit includes: an AC current control unit for generating an AC control command for controlling an AC current component flowing through each phase AC line; a circulating current control unit for calculating a circulation control command for controlling a circulating current component for each phase which circulates between the leg circuits; and a command distributing unit for determining the first voltage command and the second voltage command on the basis of the AC control command, the circulation control command, and a voltage command value for voltage between the DC buses,
the circulating current control unit includes: a compensator for calculating a first control command so that circulating current for each phase which circulates between the leg circuits approaches a circulating current command value; and a suppression unit for generating a second control command for suppressing at least one of a double-frequency component and a quadruple-frequency component of an AC fundamental wave, which are contained in the calculated first control command, and
the circulating current control unit calculates the circulation control command by combining the first control command and the second control command.

2. The power conversion device according to claim 1, wherein
the suppression unit includes a first cosine compensator and a first sine compensator which perform calculations so as to respectively suppress two types of components calculated by multiplying the first control command by each of a cosine and a sine of a double phase of the AC fundamental wave, and
the suppression unit generates the second control command on the basis of a voltage command obtained by combining two types of results obtained by multiplying again results of the calculations of the first cosine compensator and the first sine compensator by a cosine and a sine of the double phase, respectively.

3. The power conversion device according to claim 1, wherein
the suppression unit includes a second cosine compensator and a second sine compensator which perform calculations so as to respectively suppress two types of components calculated by multiplying the first control command by each of a cosine and a sine of a quadruple phase of the AC fundamental wave, and
the suppression unit generates the second control command on the basis of a voltage command obtained by combining two types of results obtained by multiplying again results of the calculations of the second cosine compensator and the second sine compensator by a cosine and a sine of the quadruple phase, respectively.

4. The power conversion device according to claim 1, wherein
the suppression unit includes: a first rotating coordinate conversion unit for performing rotating coordinate conversion of the first control command, using a double phase of the AC fundamental wave; a compensator for performing calculation so as to suppress a component outputted from the first rotating coordinate conversion unit; and a first stationary coordinate conversion unit for performing stationary coordinate conversion of a result of the calculation of the compensator, using the double phase, and
the suppression unit generates the second control command on the basis of output of the first stationary coordinate conversion unit.

5. The power conversion device according to claim 1, wherein
the suppression unit includes: a second rotating coordinate conversion unit for performing rotating coordinate conversion of the first control command, using a quadruple phase of the AC fundamental wave; a compensator for performing calculation so as to suppress a component outputted from the second rotating coordinate conversion unit; and a second stationary coordinate conversion unit for performing stationary coordinate conversion of a result of the calculation of the compensator, using the quadruple phase, and
the suppression unit generates the second control command on the basis of output of the second stationary coordinate conversion unit.

6. The power conversion device according to claim 1, wherein
the compensator for calculating the first control command uses proportional control, and the suppression unit for generating the second control command uses integral control.

7. The power conversion device according to claim 1, wherein
a connection point between the positive arm and the negative arm in each leg circuit is connected to each phase AC line.

8. The power conversion device according to claim 1, wherein
a reactor is provided in series in only one of the positive arm and the negative arm in each leg circuit, or reactors having different reactances are respectively provided in series in the positive arm and the negative arm.

9. The power conversion device according to claim 8, wherein
the reactor is provided in series in only the negative arm of each leg circuit.

10. The power conversion device according to claim 9, wherein
the reactor is provided on a negative side of the converter cell in the negative arm.

11. The power conversion device according to claim 1, wherein
the command distributing unit determines the first voltage command and the second voltage command by subtracting voltage drop portions due to inductance components in the positive arm and the negative arm from voltages assigned as outputs of the positive arm and the negative arm, respectively.

12. The power conversion device according to claim 1, wherein
each phase AC line is connected to a three-phase AC circuit, and
the command distributing unit determines the first voltage command and the second voltage command, using each phase voltage of the three-phase AC circuit as a feedforward term.

13. The power conversion device according to claim 1, wherein
the power converter is connected to a DC grid via the positive and negative DC buses.

14. The power conversion device according to claim 2, wherein
the suppression unit includes a second cosine compensator and a second sine compensator which perform calculations so as to respectively suppress two types of components calculated by multiplying the first control command by each of a cosine and a sine of a quadruple phase of the AC fundamental wave, and
the suppression unit generates the second control command on the basis of a voltage command obtained by combining two types of results obtained by multiplying again results of the calculations of the second cosine compensator and the second sine compensator by a cosine and a sine of the quadruple phase, respectively.

15. The power conversion device according to claim 4, wherein
the suppression unit includes: a second rotating coordinate conversion unit for performing rotating coordinate conversion of the first control command, using a quadruple phase of the AC fundamental wave; a compensator for performing calculation so as to suppress a component outputted from the second rotating coordinate conversion unit; and a second stationary coordinate conversion unit for performing stationary coordinate conversion of a result of the calculation of the compensator, using the quadruple phase, and the suppression unit generates the second control command on the basis of output of the second stationary coordinate conversion unit.

* * * * *